United States Patent
Raber et al.

(10) Patent No.: US 12,451,780 B2
(45) Date of Patent: Oct. 21, 2025

(54) ELECTRIC AXIAL FLUX MACHINE (71) Applicant: Schaeffler Technologies AG & Co. KG, Herzogenaurach (DE)

(72) Inventors: Christoph Raber, Ottweiler-Steinbach (DE); René Daikeler, Sasbach (DE); Shen Ding, Achern (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 199 days.

(21) Appl. No.: 18/278,432

(22) PCT Filed: Feb. 7, 2022

(86) PCT No.: PCT/DE2022/100102
§ 371 (c)(1),
(2) Date: Aug. 23, 2023

(87) PCT Pub. No.: WO2022/179659
PCT Pub. Date: Sep. 1, 2022

(65) Prior Publication Data
US 2024/0136902 A1   Apr. 25, 2024
US 2024/0235351 A9   Jul. 11, 2024

(30) Foreign Application Priority Data
Feb. 26, 2021   (DE) .................. 102021104669.6

(51) Int. Cl.
*H02K 21/02*   (2006.01)
*H02K 1/18*   (2006.01)
*H02K 7/08*   (2006.01)

(52) U.S. Cl.
CPC ........... *H02K 21/026* (2013.01); *H02K 1/182* (2013.01); *H02K 7/083* (2013.01); *H02K 2213/03* (2013.01)

(58) Field of Classification Search
CPC ...... H02K 21/026; H02K 1/182; H02K 7/083; H02K 2213/03
(Continued)

(56) References Cited

U.S. PATENT DOCUMENTS 5,982,070 A   11/1999   Caamano
6,011,337 A *   1/2000   Lin ..................... H02K 29/03
                                                            310/158
(Continued)

FOREIGN PATENT DOCUMENTS

DE   102019131918   12/2020
DE   102020104857   12/2020
(Continued)

*Primary Examiner* — Jose A Gonzalez Quinones
(74) *Attorney, Agent, or Firm* — Volpe Koenig (57) ABSTRACT

An electric axial flux machine having a stator with first and second stator elements arranged spaced apart axially from one another, and a rotor with a rotor body arranged on a rotor shaft, in the form of a disk and arranged axially between the first and second stator elements, the first and second stator elements being arranged movably in the axial direction in relation to the rotor body. An adjustment device is provided to adjust the first stator element and the second stator element in the axial direction in order to set an air gap. The adjustment device adjusts the first stator element and the second stator element in the axial direction depending on a torque which is to be transmitted via the rotor shaft and which generates a resulting supporting moment on the first stator element and on the second stator element.

19 Claims, 5 Drawing Sheets

(58) Field of Classification Search
USPC .................. 310/156.32, 156.35, 267–268
See application file for complete search history.

(56) References Cited

U.S. PATENT DOCUMENTS

2009/0134723 A1    5/2009  Takeuchi
2009/0206602 A1*   8/2009  Nakamura ............... F03D 9/25
                                                    310/90

FOREIGN PATENT DOCUMENTS

| DE | 102020113905 | 1/2021 |
| DE | 102020114855 | 9/2021 |
| EP | 2985893 | 2/2016 |
| JP | 2005117834 | 4/2005 |
| JP | 5135693 | 2/2013 |
| WO | 2010117178 | 10/2010 |

* cited by examiner

ELECTRIC AXIAL FLUX MACHINE

CROSS-REFERENCE TO RELATED APPLICATION

This application is the U.S. National Phase of PCT Appln. No. PCT/DE2022/100102, filed Feb. 7, 2022, which claims priority from German Patent Application No. 10 2021 104 669.6, filed Feb. 26, 2021, the entire disclosures of which are incorporated by reference herein.

TECHNICAL FIELD

The present disclosure relates to an electric axial flux machine in an I arrangement, comprising a stator with a first stator element and with a second stator element arranged spaced apart axially from the first stator element, and a rotor with a rotor body which is arranged on a rotor shaft, is in the form of a disk and is arranged axially between the first stator element and the second stator element, wherein the first stator element and the second stator element are arranged movably in the axial direction in relation to the rotor body. Further, the axial flux machine comprises an adjustment device, wherein the adjustment device is designed to adjust the first stator element and the second stator element in the axial direction in order to set an air gap.

BACKGROUND

Electric axial flux machines are already sufficiently known from the prior art.

Axial flux machines are also already sufficiently known from the prior art.

An electric axial flux machine having a stator and a rotor is known from EP 2 985 893 A1, wherein the stator comprises at least two stator segments, and wherein the rotor is connected to a rotor shaft, wherein the rotor and/or the rotor shaft are rotatably mounted on a bearing, and wherein the stator segments are arranged to be immovable relative to the bearing in the direction of rotation of the rotor. At least one of the stator segments is movably arranged in the axial or radial direction relative to the bearing in order to set the width of the air gap between the rotor and stator segments.

For example, DE 10 2019 131 198 A1 further describes a modular axial flux motor for driverless transport vehicles, which comprises at least one stator in the form of a disk and at least one rotor in the form of a disk rotatable relative to the stator. The rotor and the stator are arranged axially next to one another. The stator comprises electric coils. The rotor has at least one permanent magnet with alternating poles. The rotor shaft is conventionally mounted in housing side walls or the like via roller bearings.

In most cases, the rolling bearings are preloaded in the axial direction by spring means so that the rolling element balls roll under the action of a force and in a contacting manner in the raceways between the inner ring and outer ring.

SUMMARY

It is the object of the present disclosure to provide an axial flux machine in an I arrangement which is improved with respect to a torque-dependent field amplification.

This object is achieved by an electric axial flux machine having one or more of the features disclosed herein. An axial flux machine according to the disclosure comprises a stator with a first stator element and with a second stator element arranged spaced apart axially from the first stator element, and a rotor with a rotor body which is arranged on a rotor shaft, is in the form of a disk and is arranged axially between the first stator element and the second stator element, wherein the first stator element and the second stator element are arranged movably in the axial direction in relation to the rotor body. Furthermore, the axial flux machine according to the disclosure comprises an adjustment device, wherein the adjustment device is designed to adjust the first stator element and the second stator element in the axial direction in order to set an air gap. According to the disclosure, the adjustment device is designed to adjust the first stator element and the second stator element in the axial direction depending on a torque which is to be transmitted via the rotor shaft and which generates a resulting supporting moment on the first stator element and on the second stator element. This provides the advantage that the air gap between the stator and rotor can be set depending on the operating situation without the need for an additional actuator.

First, the individual elements of the disclosure are explained in the order in which they are named in the set of claims and particularly preferred embodiments of the subject matter of the disclosure are described below.

The magnetic flux in an electric axial flux machine (AFM), such as an electric drive machine of a motor vehicle designed as an axial flux machine, is directed axially to a direction of rotation of the rotor of the axial flux machine in the air gap between the stator and the rotor. There are various types of axial flux machines. One known type is what is termed an I arrangement, in which the rotor is arranged so as to be axially adjacent to a stator or between two stators. Another known type is what is termed an H arrangement, in which two rotors are arranged on opposite axial sides of a stator.

The stator of an electric axial flow machine has a stator body with a plurality of stator windings arranged in the circumferential direction. The stator body can be designed to be in one piece or segmented, as seen in the circumferential direction. The stator body can be formed from a laminated stator core with multiple laminated electrical sheets. Alternatively, the stator body can also be formed from a compressed soft magnetic material, such as what is termed an SMC (soft magnetic composite) material.

A rotor shaft is a rotatably mounted shaft of an electric machine to which the rotor or rotor body is coupled in a non-rotatable manner.

The rotor of an electric axial flux machine can be designed at least in parts as a laminated rotor. A laminated rotor is designed to be layered in the axial direction. The axial magnetic flux has to overcome the adhesive or insulation layers between the stacked individual electrical sheets, causing the magnetic circuit to experience shear (additional air gap) and lose efficiency. Alternatively, the rotor of an axial flux machine can also have a rotor carrier which is correspondingly equipped with magnetic sheets and/or SMC material and with magnetic elements designed as permanent magnets.

Advantageous embodiments according to the disclosure are specified in the dependent claims. The features listed individually in the dependent claims can be combined with one another in a technologically meaningful manner and can define further embodiments according to the disclosure. In addition, the features indicated in the claims are specified and explained in more detail in the description, wherein further preferred embodiments are shown.

According to an advantageous embodiment, the adjustment device can comprise at least one spring device which acts on the first stator element and on the second stator element counter to the magnetic attraction force between the rotor body and the stator, wherein the spring device is configured in such a way that a spring force characteristic curve is formed which extends above the magnetic force characteristic curve over the entire adjustment path. The advantage of this embodiment is that a mechanical adjustment unit can be used which only has to work on pressure (for example a wedge) and the force which has to be overcome by this unit is greatly reduced.

According to a further preferred further development, the spring device can comprise a first spring element, a second spring element and a third spring element, wherein the first spring element is designed as an axially centrally arranged leaf spring assembly arrangement with a plurality of individual leaf spring assemblies, and wherein the second spring element is designed as a disk spring arranged axially between the first spring element and the first stator element, and wherein the third spring element is designed as a disk spring arranged axially between the first spring element and the second stator element. In this way, it can be achieved that the given magnetic force of the system, which is not linear, can be followed optimally with a predeterminable distance.

Furthermore, according to an equally advantageous embodiment, the first spring element, the second spring element and the third spring element can be mechanically arranged in series in such a way that over a first adjustment path section both the first spring element and the second and third spring elements are compressed at least partially but not completely and that within a second adjustment path section following the first adjustment path section the first spring element remains completely compressed, while the second and third spring elements are further compressed. The advantageous effect of this design is due to the fact that, in addition to optimizing the course of the spring force, the solidity of the entire spring device can be improved compared to the magnetic force specified by the system.

According to a further particularly preferred embodiment, the first stator element can have a stator carrier designed to be pot-shaped which receives a first laminated stator core in a pot-like receptacle and which has a radially outwardly directed ring collar at the free end of its axially extending annular (hollow cylindrical) side wall, and the second stator element has a stator carrier designed to be pot-shaped which receives a second laminated stator core in a pot-like receptacle and which has a radially outwardly directed ring collar at the free end of its annular (hollow cylindrical) side wall. In this regard, the first stator carrier and the second stator carrier are essentially of the same design and are arranged mirror-symmetrically relative to one another. The spring device is also of circular ring design and is arranged between the ring collars of the first stator element and second stator element. This has the particular effect of allowing the compensation forces to be supported between the stators, which move together in a rotating manner, thus avoiding the need for an additional, highly loaded bearing. The constructive design can thus be simplified and costs can be saved.

Advantageously, the respective laminated core of the stator is fastened via pin-shaped fastening means in the pot space of the stator carrier designed to be pot-shaped in each case. Particularly preferably, the fastening means are positioned or arranged in such a way that, as seen in the axial direction, the respective fastening means divides the circular ring area ($A_{tot}$) of the respective stator element into an inner partial circular ring area ($A_{inner}$) and an outer partial circular ring area ($A_{outer}$) of equal size. In particular, the circular ring areas are formed perpendicular to the axis of rotation of the rotor body. This allows the fastening to be located exactly at the theoretical point of application of the magnetic force, so that there is no lever arm that would place an additional load on the stator core.

According to a further preferred embodiment of the subject matter of the disclosure, the axial flux machine can have a housing in which the rotor shaft is arranged axially on both sides via a respective rotor shaft receptacle within a motor housing. Advantageously, each rotor shaft receptacle receives the rotor shaft on its one axial side via a bearing, in particular with rolling elements, and the rotor shaft receptacle is supported on its other axial side against a housing wall of the motor housing or is fixedly received therein. A compact design can thus be achieved by combining the motor bearing and adjustment mechanism.

Finally, the disclosure can also be implemented in an advantageous manner in that axial setting means (for example in the form of insertable circular ring disk-shaped spacer or screening disks) are provided for the axial centering of the rotor relative to the stator, by means of which the rotor with its rotor body can be positioned axially relative to the stator elements arranged axially adjacent. This allows a kind of basic setting or center positioning of the central rotor body relative to the two axially adjacent stator elements to be achieved by constructively simple means as part of manufacture.

In a particularly preferred further development of the axial flux machine, it is characterized in that the adjustment device has a first adjustment unit associated with the first stator element and a second adjustment unit associated with the second stator element, wherein each of the two adjustment units has a stationary adjustment element arranged axially on the outside, in particular connected to the respective rotor shaft receptacle in a non-rotatable and non-displaceable manner, and an adjustment element axially on the inside designed to be axially displaceable and rotatable at least in regions relative to the stationary adjustment element located on the outside and fixedly connected to the stator element associated therewith. In this regard, at least one rolling element is arranged in each case between the stationary adjustment element and the axially displaceable adjustment element. Furthermore, the stationary adjustment element has a first ramp element on its side facing the displaceable adjustment element and the displaceable adjustment element has a second ramp element on its side facing the stationary adjustment element, wherein the first ramp element and the second ramp element are designed in such a way that, in the event of a rotation of the first adjustment element relative to the second adjustment element or vice versa, the respectively associated stator element is displaced axially relative to the rotor shaft in such a way that the air gap formed between the respective stator element and the rotor body is reduced in its axial extent. This enables a reliable torque-dependent setting of the air gaps formed between the rotor body and the stator elements by constructively simple means, and thus reliable field weakening or field amplification of the electric machine. Preferably, the two stator elements are arranged in a floating manner on the rotor shaft or on a rotor shaft receptacle and the two stator elements support one another via the adjustment device so that separate additional support means can be omitted or are not required.

Advantageously, the spring device is designed in such a way that a spring force characteristic curve is reproduced which, over the entire adjustment path, is above a function F magnet_grenz=F magnet+Fmagnet_max*—in other words, the spring force over the entire adjustment path is slightly above the magnetic attraction force prevailing between the rotor and the stator elements, so that only very small forces are required for adjusting the two stator elements. Particularly preferably, the first spring element is designed to reproduce a linear spring force characteristic curve. The second and third spring elements are advantageously designed to reproduce a progressive spring force characteristic curve.

Between the first adjustment element and the second adjustment element, stopping means are preferably provided which are designed in such a way that, in an operating state with a predetermined torque which is above a predetermined maximum adjustment torque, the occurring torque is transmitted via the stopping means instead of via the corresponding first and second ramp means of the first and second adjustment elements. This has the advantage that the ramp structure is relieved with regard to the supporting forces.

The first stator element and the second stator element are preferably rotationally coupled to one another in such a way that during operation of the axial flux machine no relative rotation takes place between the first stator element and the second stator element. By means of the spring device arranged between the first and second stator elements, a friction-locking connection between the two rotor bodies can be implemented for this purpose, or alternatively a connector element for rotational coupling can be provided between the spring device and each stator element.

Particularly preferably, the first spring element comprises at least six individual leaf spring assemblies as well as a carrier ring designed in the shape of an annular disk and two spring bearing rings, wherein three leaf spring assemblies are arranged between the axially centrally arranged carrier ring and in each case one axially adjacent spring bearing ring, distributed uniformly around the circumference, on each side. This creates a central spring element that is constructively space-saving and simple in design. In particular, the spring device is constructed in such a way that the two spring bearing rings, which are arranged axially spaced apart from the central carrier ring and are fixedly connected on both sides to the respective individual leaf spring assembly, move rotationally in the same direction over the entire axial adjustment path and without a relative rotational offset with respect to one another. In this regard, each of the individual leaf spring assemblies is fixedly attached to the carrier ring at one free end and each of the individual leaf spring assemblies is fixedly attached at its other free end to the spring bearing ring axially spaced apart from the carrier ring via the individual leaf spring assemblies. Advantageously, the spring device is designed in such a way that the two spring bearing rings, which are arranged axially spaced apart from the carrier ring and are fixedly connected on both sides to the respective individual leaf spring assemblies, move rotationally in the same direction over the entire adjustment path and without a relative rotational offset with respect to one another. This creates a spring assembly which, due to its scissor-joint-like design, prevents relative rotation and thus tension in the circumferential direction between the two axially spaced apart spring bearing rings when the spring assembly is compressed and then released over the entire adjustment path.

In summary, the magnetic force between the rotor and stator changes as a function of the width of the air gap, so that the spring force of the spring device, which is designed as a compensation spring, must also change over the path of the adjustment. To keep the force on the adjustment unit as small as possible, the difference in force between the two characteristic curves must be kept as small as possible. However, it must be ensured that the spring force is always greater than the magnetic force so that a preload remains on the adjustment unit. The adjustment is made by the applied torque in the electric machine, which generates an additional axial force via a ball ramp of the adjustment unit, which leads to the axial adjustment. In the proposed design, a constant ramp slope, and thus two end positions of the adjustment are implemented.

However, it would also be conceivable to implement several intermediate positions if the ramp slope is designed to be variable via the twist angle.

In the initial and intermediate positions, the torque is supported by the ramp system, since otherwise no adjustment could take place.

In the end position, which is used for high torques in the electric machine, an additional connection between the ramps is preferably implemented in order to support the high applied torques. This rotational support should have a finite stiffness.

As a whole, the system described above works in such a way that the spring forces necessary for both sides support one another. This means that no internal force support via an additional bearing is required. Another advantage in this regard is that the two sides of the ramp are coupled in the direction of rotation via the frictional force of the springs. In order to be able to implement the spring characteristic curve in the available installation space, two individual springs are required on each side. Leaf spring assemblies are used on both sides for the long but almost constant increase at the beginning of the adjustment. These leaf spring assemblies self-limit after a certain distance as they are compressed into a block. They can be protected from overloading by self-limiting. So that the leaf springs can be attached to the same carrier component from both sides, they must have the same geometry (hole spacing, thickness, installation height, bolt circle, etc.). However, the condition is that they must be oriented in opposite directions. This means that when the springs change their axial height during operation, the radial path created thereby must be equal in magnitude and in the same direction. If not, the leaf springs will build up internal torque that will inhibit adjustment and place a significant load on the components.

On the other hand, the use of the leaf springs at the same time provides for the centering of the spring unit itself. After the leaf springs are on block, i.e., they no longer have any spring properties, the disk springs also installed take over for the last section of the characteristic curve. In the first part of the characteristic curve, both the disk springs and the leaf springs are active, but since the disk springs are very stiff compared to the leaf springs, they have little influence on the overall stiffness at the beginning of the characteristic curve.

Figure 5:
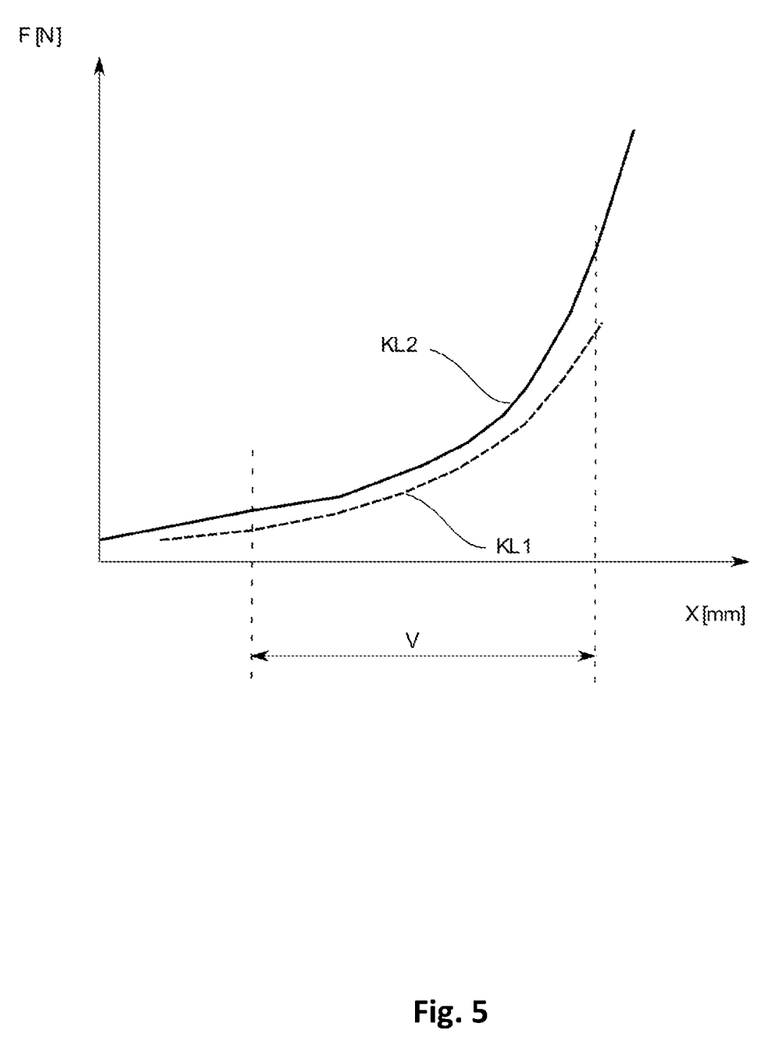
FIG. 5 shows two different force characteristic curves over the adjustment path of the adjustment device according to the disclosure, wherein the lower characteristic curve shows the force characteristic of the magnetic force prevailing between the rotor and stator and wherein the upper characteristic curve shows the force characteristic of the compensation spring or the spring device.

The spring and magnetic forces considered for the function are shown in the diagram in FIG. 5. In order to position the characteristic curves well and as far as possible without tolerance influences with respect to one another, it can be advantageous to set the height of the adjustment unit by means of disks during assembly. The proposed design makes this possible, as the interfaces are chosen such that the heights can be adjusted at different points. This can be done, for example, under the ramp units or under the outer locking ring of the bearing shaft. In the illustrations shown, these compensating disks are arranged under the stationary ramp elements.

A further advantage of the design shown is that the large magnetic forces, which generally have to be supported by the outer bearings in this motor variant, are greatly reduced by the internal supporting of the forces. This means that the bearing requires a less elaborate design to the outside (bearings can be smaller).

BRIEF DESCRIPTION OF THE DRAWINGS

Both the disclosure and the technical field are explained in more detail below with reference to the figures. It should be noted that the disclosure is not intended to be limited by the exemplary embodiments shown. In particular, unless explicitly stated otherwise, it is also possible to extract partial aspects of the subject matter outlined in the figures and to combine them with other components and knowledge from the present description and/or figures. In particular, it should be noted that the figures and in particular the size ratios shown are only schematic in nature. Identical reference symbols indicate the same objects, so that where applicable, explanations from other figures can also be used.

In the figures.

DETAILED DESCRIPTION

Figure 1:
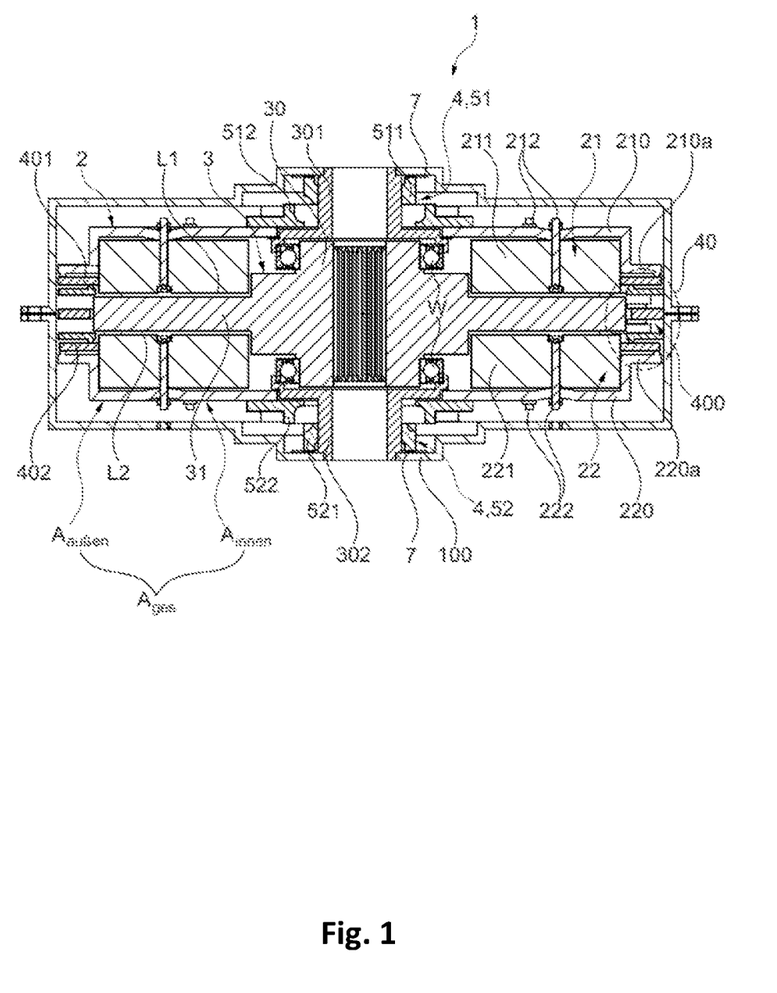
FIG. 1 shows a schematic representation of a possible embodiment of an axial flux machine according to the disclosure in an I arrangement in a field-amplified operating position with the smallest possible air gaps between the centrally arranged rotor body and the stator elements arranged axially adjacent on both sides, in an axial sectional view.
Figure 2:
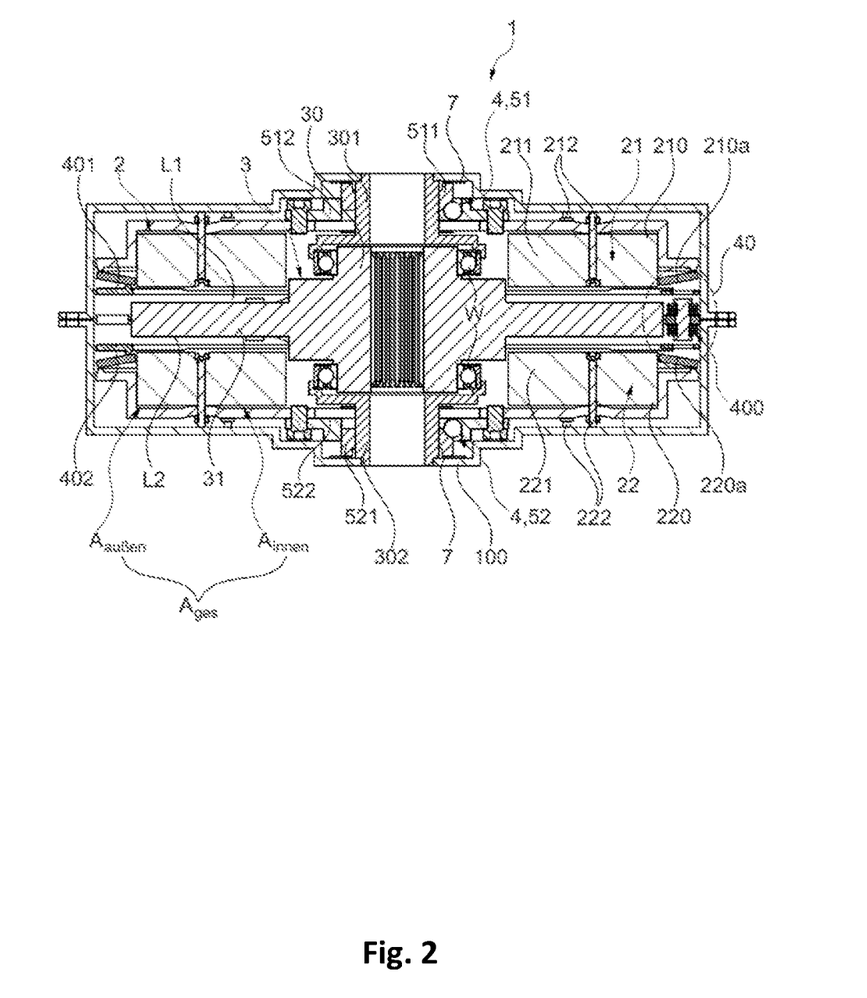
FIG. 2 shows the axial flux machine according to the disclosure as shown in FIG. 1, in a field-weakened operating position with the largest possible air gaps between the centrally arranged rotor body and the stator elements arranged axially adjacent on both sides.

FIG. 1 shows a schematic representation of a possible embodiment of the axial flux machine 1 according to the disclosure in an I arrangement, in an axial sectional view. The axial flux machine 1 shown is arranged in a field-amplified operating position with the smallest possible air gaps L1, L2 between the centrally arranged rotor body 31 and the stator elements 21, 22 arranged axially adjacent on both sides. The axial flux machine 1, shown with an integrated torque-dependent adjustment device 4 for setting the air gaps between the central rotor body 31 and the two stator elements 21, 22 arranged so as to be axially displaceable on both sides, is primarily a field-amplifying arrangement—the field-weakened "resting" or "initial" state is shown in FIG. 2. The two stator elements 21, 22 are attracted in the direction of the rotor body 31 by the magnetic attraction forces between the rotor 3 and stator 2. The two stator elements 21, 22 are pressed in the direction away from the rotor body 31 (or pushed apart) by the spring device 40 arranged between the two stator elements 21, 22, which counteracts the magnetic attraction force with its force and whose spring force is dimensioned such that it is slightly greater than the magnetic force between the stator 2 and rotor 3 over the entire adjustment path. Thus, the air gaps L1, L2 (large at the beginning) (see FIG. 2) are reduced when the electric machine is started up, where the torque arrangement is usually quite large (see FIG. 1), while at higher speeds with lower torque requirements the air gaps L1, L2 are automatically enlarged again by the spring device (see FIG. 2), so that an operation of the electric machine 1 with lower losses is ensured.

FIG. 2 shows the axial flux machine 1 according to the disclosure as shown in FIG. 1, in a field-weakened operating position (e.g., rest position) with the largest possible air gaps L1, L2 between the centrally arranged rotor body 31 and the stator elements 21, 22 arranged axially adjacent on both sides.

FIGS. 1 and 2 each show an electric axial flux machine 1 comprising a stator 2 with a first stator element 21 and with a second stator element 22 arranged spaced apart axially from the first stator element 21, and a rotor 3 with a rotor body 31 which is arranged on a rotor shaft 30, is in the form of a disk and is arranged axially between the first stator element 21 and the second stator element 22. The first stator element 21 and the second stator element 22 are arranged movably in the axial direction in relation to the rotor body 31. Furthermore, an adjustment device 4 is provided for setting the air gaps L1, L2 between the central rotor body 31 and the two adjacently arranged and axially displaceable stator elements 21, 22. The adjustment device 4 is designed to adjust the first stator element 21 and the second stator element 22 in the axial direction in order to set an air gap L1, L2. In this regard, the adjustment device 4 is designed to adjust the first stator element 21 and the second stator element 22 in the axial direction depending on a torque which is to be transmitted via the rotor shaft 3 and which generates a resulting supporting moment on the first stator element 21 and on the second stator element 22. The adjustment device 4 comprises, in this regard, at least two adjustment units 51, 52 designed in the form of a ball-ramp system, wherein one adjustment unit 51, 52 each is associated with each stator element 21, 22, and further comprises a spring device 40 arranged between the two stator elements 21, 22, which, in the present embodiment, forces the two stator elements 21, 22 apart to weaken the field when the torque requirements of the electric machine are low, thus enlarging the air gaps L1, L2.

The spring device 40 is configured for this purpose in such a way that a spring force characteristic curve KL2 is formed which extends above the magnetic force characteristic curve KL1 over the entire adjustment path V. It is also readily apparent from FIGS. 1 and 2 that the spring device 40 comprises a first spring element 401, a second spring element 402 and a third spring element 403, wherein the first spring element 400 is designed as an axially centrally arranged leaf spring assembly arrangement with a plurality of individual leaf spring assemblies 41a, 42a, and wherein the second spring element 401 is designed as a disk spring arranged axially between the first spring element 41, 42 and the first stator element 21, and wherein the third spring element 402 is designed as a disk spring arranged axially between the first spring element 400 and the first stator element 21. The first spring element 400, the second spring element 401 and the third spring element 402 are mechanically arranged in series in such a way that over a first adjustment path section both the first spring element 400 and the second and third spring elements 401, 402 are compressed at least partially but not completely and that within a second adjustment path section following the first adjustment path section the first spring element 400 remains completely compressed.

The first stator element 21 has a stator carrier 210 designed to be pot-shaped which receives a first laminated stator core 211 in a pot-like receptacle and which has a radially outwardly directed ring collar 210*a* at the free end of its axially extending annular side wall. Similarly, the second stator element 22 also has a stator carrier 220 designed to be pot-shaped which receives a second laminated stator core 221 in a pot-like receptacle and which has a radially outwardly directed ring collar 220*a* at the free end of its annular side wall. The first stator carrier 210 and the second stator carrier 220 are essentially of the same design and are arranged mirror-symmetrically relative to one another. The spring device 40 arranged between the ring collars 210*a*, 22*a* of the two stator carriers 21, 22 is of circular ring design.

The respective laminated core of the stator 2 is fastened via fastening means 212, 222 in the form of screws in the pot space of the stator carrier 210, 220 designed to be pot-shaped in each case. Particularly preferably, the fastening means 212, 222 are positioned or arranged in such a way that the fastening means 212 of the first stator element 21 and the fastening means 222 of the second stator element 22, as seen in the radial direction, are arranged in such a way that, as seen in the axial direction, the respective fastening means 212; 222 divides the circular ring area $A_{tot}$ of the stator element 21; 22, which is arranged perpendicular to the axis of rotation of the rotor body 31, into an inner partial circular ring area $A_{inner}$ and an outer partial circular ring area $A_{outer}$ of equal size.

The axial flux machine 1 has a housing 100, wherein the rotor shaft 30 is arranged axially on both sides via a respective rotor shaft receptacle 301, 302 within a motor housing 100. Each rotor shaft receptacle 301, 302 receives the rotor shaft 3 (or a shaft section of the rotor body 31) on its one axial side via a bearing with rolling elements W, while the rotor shaft receptacle 301, 302 is supported on its other axial side against a housing wall of the motor housing 100 or is fixedly received therein.

Axial setting means 7 are provided for the axial centering of the rotor 3 relative to the stator 2, such as screening disks or the like, by means of which the rotor 3 with its rotor body 31 can be positioned axially relative to the stator elements 21, 22 arranged axially adjacent.

Figure 4:
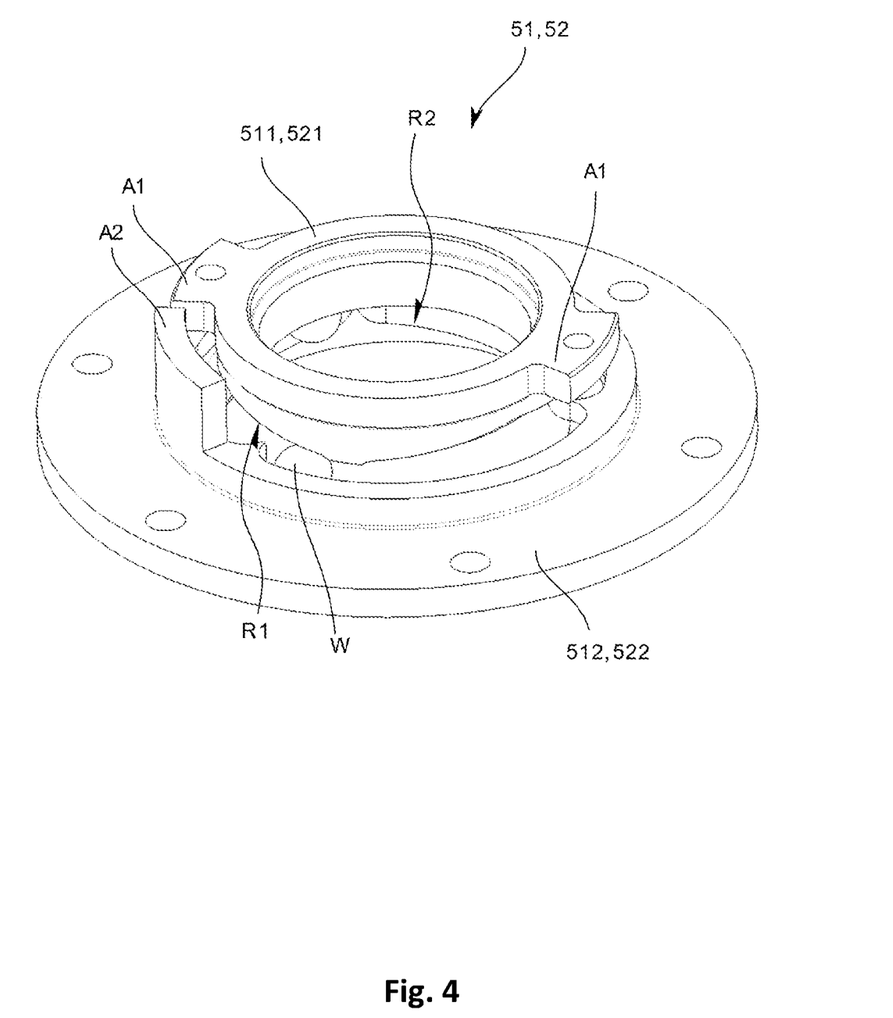
FIG. 4 shows an adjustment unit of the adjustment device according to the disclosure in a perspective view.

The adjustment device 4 per se has a first adjustment unit 51 associated with the first stator element 21 and a second adjustment unit 52 associated with the second stator element 22, wherein each of the two adjustment units 51, 52 has a stationary adjustment element 511, 521 arranged axially on the outside, in particular connected to the respective rotor shaft receptacle 301, 302 in a non-rotatable and non-displaceable manner, and an adjustment element 512, 522 axially on the inside designed to be axially displaceable and rotatable at least in regions relative to the stationary adjustment element 511, 521 located on the outside and fixedly connected to the stator element 21, 22 associated therewith. In this regard, at least three rolling elements W are arranged distributed circumferentially between the stationary adjustment element 511, 521 and the axially displaceable adjustment element 512, 522. As shown in FIG. 4, the stationary adjustment element 511, 521 has a first ramp element R1 on its side facing the displaceable adjustment element 512, 522 and the displaceable adjustment element 512, 522 has a second ramp element R2 on its side facing the stationary adjustment element 511, 521, wherein the first ramp element R1 and the second ramp element R2 are designed in such a way that, in the event of a rotation of the first adjustment element R1 relative to the second adjustment element R2 or vice versa, the respectively associated stator element 21, 22 is displaced axially relative to the rotor shaft 3 in such a way that the air gap L1, L2 formed between the respective stator element 21, 22 and the rotor body 31 is reduced or enlarged in its axial extent.

Due to the structural design, the two stator elements 21, 22 are arranged in a floating manner on the rotor shaft 30 or on the rotor shaft receptacle 301, 302. Furthermore, the two stator elements 21, 22 support one another via the adjustment device 4. The spring device 40 is designed to reproduce a spring force characteristic curve KL2 which, over the entire adjustment path, is below a function F magnet_grenz=F magnet+Fmagnet_max*0.3. For this purpose, the first spring element 400 is designed to reproduce a linear spring force characteristic curve and the second and third spring elements 401, 402 are designed to reproduce a progressive spring force characteristic curve.

Between the first adjustment element 511, 521 and the second adjustment element 512, 522, stopping means A1, A2 (acting in the rotational direction) are provided which are designed in such a way that, in an operating state with a predetermined torque which is above a predetermined maximum adjustment torque, the occurring torque is transmitted via the stopping means A1, A2 instead of via the corresponding first and second ramp means R1, R2 of the first and second adjustment elements 51; 52. For this purpose, the first adjustment element 511, 521 has two stopping segments directed radially outward, which interact with stopping elements formed in the axial direction on the second adjustment element 512, 522.

The first stator element 21 and the second stator element 22 are rotationally coupled to one another in such a way that during operation of the axial flux machine 1 no relative rotation takes place between the first stator element 21 and the second stator element 22. For this purpose, a friction-locking connection between the two rotor bodies 31; 32 is implemented via the spring device 40 arranged between the first and second stator elements 21; 22. Alternatively—and not shown here—a connector element for rotational coupling can be provided between the spring device 40 and each stator element 21, 22.

Figure 3:
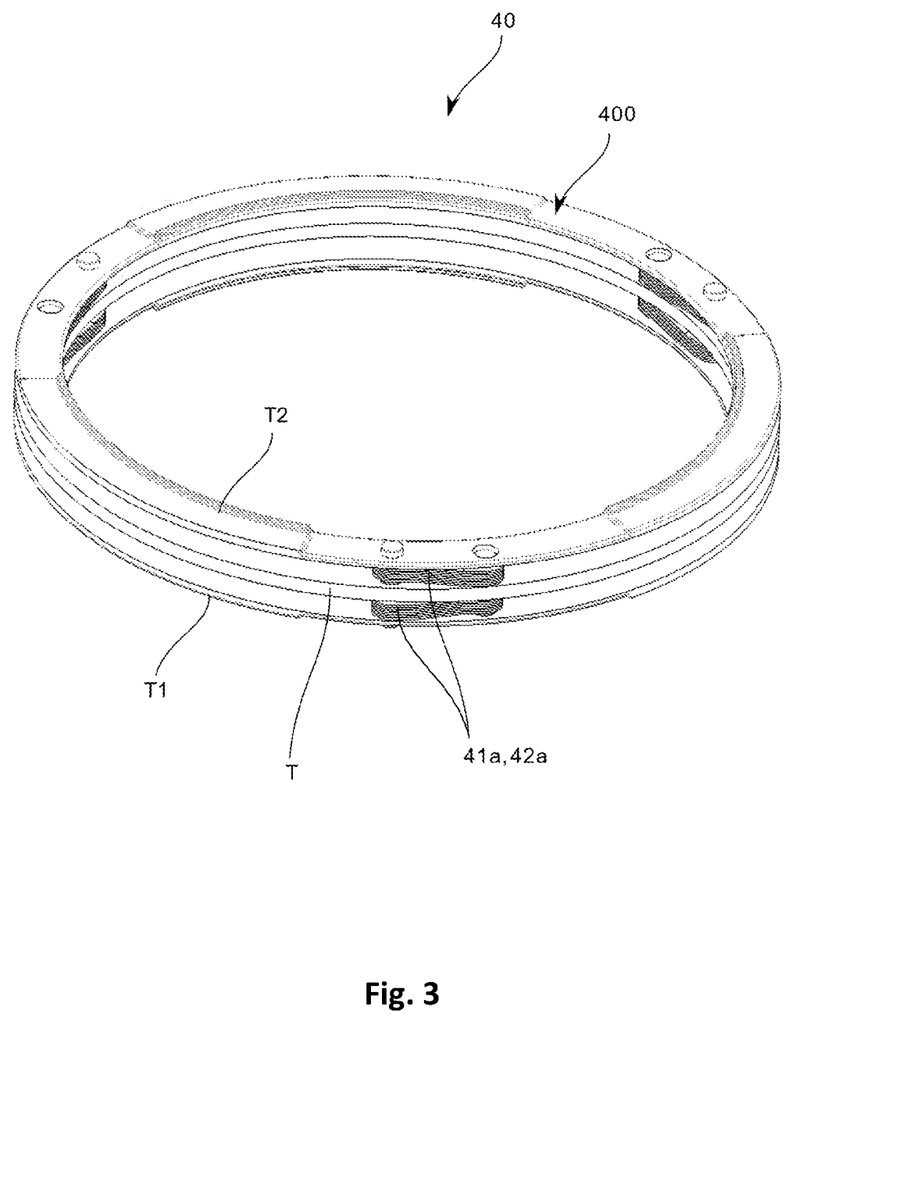
FIG. 3 shows a central first spring element of a spring device of the adjustment device according to the disclosure in a perspective view.

FIG. 3 shows a central first spring element 400 of a spring device 40 of the adjustment device 4 according to the disclosure in a perspective view. According to FIG. 3, the first spring element 400 comprises a total of six individual leaf spring assemblies 41*a*, 42*a* as well as a carrier ring T designed in the shape of an annular disk and two spring bearing rings T1, T2. Three leaf spring assemblies 41*a*, 42*a* are arranged between the axially centrally arranged carrier ring T and in each case one axially adjacent spring bearing ring T1, T2, distributed uniformly around the circumference, on each side. The two spring bearing rings T1, T2, which are arranged axially spaced apart from the central carrier ring T and are fixedly connected on both sides to the respective individual leaf spring assemblies 41*a*, 42*a*, move rotationally in the same direction over the entire axial adjustment path V and without a relative rotational offset with respect to one another. The spring assembly shown thus has an overall scissor-joint-like design, which prevents relative rotation and thus tension in the circumferential direction between the two axially spaced apart spring bearing rings when the spring assembly is compressed and then released over the entire adjustment path.

FIG. 5 shows two different force characteristic curves KL1, KL2 over the adjustment path V of the adjustment device 4 according to the disclosure, wherein the lower characteristic curve KL1 shows the force characteristic of the magnetic force prevailing between the rotor 3 and stator 2 and wherein the upper characteristic curve KL2 shows the force characteristic of the compensation spring or the spring device 40.

The disclosure is not limited to the embodiments shown in the figures. The above description is therefore not to be regarded as limiting, but rather as illustrative. The following claims are to be understood as meaning that a named feature is present in at least one embodiment of the disclosure. This does not exclude the presence of further features. If the patent claims and the above description define 'first' and 'second' features, this designation serves to distinguish between two features of the same type without defining an order of precedence.

LIST OF REFERENCE SYMBOLS

1 Axial flux machine
100 Housing
2 Stator
21 Stator element
210 Stator carrier
210a Ring collar
211 laminated stator core
22 Stator element
212 Fastening means
220 Stator carrier
220a Ring collar
221 laminated stator core
222 Fastening means
3 Rotor
30 Rotor shaft
301 Rotor shaft receptacle
302 Rotor shaft receptacle
31 Rotor body
4 Adjustment device
40 Spring device
400 First spring element
401 Second spring element
402 Third spring element
41 Individual leaf spring assemblies
5 Adjustment unit
51 First adjustment unit
511 Adjustment element
512 Adjustment element
52 Second adjustment unit
521 Adjustment element
522 Adjustment element
7 Axial setting means
$A_{tot}$ Circular ring area
$A_{inner}$ Inner partial circular ring area
$A_{outer}$ Outer partial circular ring area
W Rolling element
R1 First ramp element
R2 Second ramp element
L1 Air gap
L2 Air gap
A1 Stopping means
A2 Stopping means
T Carrier ring
T1 Spring bearing ring
T2 Spring bearing ring
V Adjustment path
x1 First adjustment path section
x2 Second adjustment path section
KL1 Force-path characteristic curve of the magnetic force over the adjustment path
KL2 Force-path characteristic curve of the spring device over the adjustment path

The invention claimed is:

1. An electric axial flux machine, comprising:
a stator with a first stator element and with a second stator element arranged spaced apart axially from the first stator element;
a rotor with a rotor body arranged on a rotor shaft, the rotor body comprising a disk arranged axially between the first stator element and the second stator element;
wherein the first stator element and the second stator element are arranged movably in an axial direction in relation to the rotor body;
an adjustment device configured to adjust the first stator element and the second stator element in the axial direction in order to set an air gap; and
the adjustment device is configured to adjust the first stator element and the second stator element in the axial direction depending on a torque which is to be transmitted via the rotor shaft and which generates a resulting supporting moment on the first stator element and on the second stator element;
wherein the adjustment device comprises at least one spring device which acts on the first stator element and on the second stator element counter to a magnetic attraction force between the rotor body and the stator, the spring device comprises a first spring element, a second spring element and a third spring element, the first spring element comprises an axially centrally arranged leaf spring assembly arrangement with a plurality of individual leaf spring assemblies and the second spring element comprises a disk spring arranged axially between the first spring element and the first stator element, and the third spring element comprises a disk spring arranged axially between the first spring element and the second stator element.

2. The axial flux machine according to claim 1, wherein the spring device is configured such that a spring force characteristic curve is formed which extends above a magnetic force characteristic curve over an entire adjustment path.

3. The axial flux machine according to claim 1, wherein the first spring element, the second spring element and the third spring element are mechanically arranged in series i such that, over a first adjustment path section, both the first spring element and the second and the third spring elements are compressed at least partially but not completely and within a second adjustment path section, following the first adjustment path section, the first spring element remains completely compressed.

4. An electric axial flux machine, comprising:
a stator with a first stator element and with a second stator element arranged spaced apart axially from the first stator element, wherein the first stator element has a first stator carrier that is pot-shaped which receives a first laminated stator core in a pot-shaped receptacle and which has a radially outwardly directed ring collar at a free end of an axially extending annular side wall, and the second stator element has a second stator carrier that is pot-shaped which receives a second laminated stator core in a pot-shaped receptacle and which has a radially outwardly directed ring collar at a free end of an annular side wall thereof, a rotor with a rotor body arranged on a rotor shaft, the rotor body comprising a disk arranged axially between the first stator element and the second stator element;

wherein the first stator element and the second stator element are arranged movably in an axial direction in relation to the rotor body;

an adjustment device configured to adjust the first stator element and the second stator element in the axial direction in order to set an air gap; and the adjustment device is configured to adjust the first stator element and the second stator element in the axial direction depending on a torque which is to be transmitted via the rotor shaft and which generates a resulting supporting moment on the first stator element and on the second stator element;

wherein the first stator carrier and the second stator carrier are of substantially identical design and are arranged mirror-symmetrically relative to one another, and a spring device comprises a circular ring shape and is arranged between the ring collars of the first stator element and the second stator element.

5. The axial flux machine according to claim 4, wherein the respective first and second laminated stator cores of the respective first and second stator elements are fastened via pin-shaped fasteners in the pot-shaped receptacles of the respective stator carriers.

6. The axial flux machine according to claim 5, wherein fasteners of the first stator element and the fasteners of the second stator element are arranged, as seen in a radial direction, such that, as seen in the axial direction, the fasteners divide a circular ring area of the first and second stator elements into an inner partial circular ring area and an outer partial circular ring area of equal size.

7. The axial flux machine according to claim 6, wherein the fasteners comprise screws or rivets for fastening the respective first and second laminated stator cores to the respective first and second stator carriers.

8. The axial flux machine according to claim 1, further comprising a housing, and the rotor shaft is arranged axially on both sides via a respective rotor shaft receptacle within a motor housing, each of the rotor shaft receptacles receives the rotor shaft on one axial side thereof via a bearing and the rotor shaft receptacle is supported on an other axial side against a housing wall of the motor housing or is fixedly received therein.

9. The axial flux machine according to claim 1, further comprising axial setting means for the axial centering of the rotor relative to the stator, by which the rotor with the rotor body is positionable axially relative to the stator elements arranged axially adjacent.

10. The axial flux machine according to claim 1, wherein the adjustment device has a first adjustment unit associated with the first stator element and a second adjustment unit associated with the second stator element, wherein each of the first and second adjustment units has a stationary adjustment element arranged axially on an outside and an adjustment element axially on an inside configured to be axially displaceable and, at least in regions, rotatable relative to the stationary adjustment element located on the outside and fixedly connected to the respective first or second stator element associated therewith, and at least one rolling element is arranged between the stationary adjustment element and the axially displaceable adjustment element, and the stationary adjustment element has a first ramp element on a side thereof facing the displaceable adjustment element and the displaceable adjustment element has a second ramp element on a side thereof facing the stationary adjustment element, the first ramp element and the second ramp element are arranged such that, upon a rotation of the first adjustment element relative to the second adjustment element or vice versa, the respectively associated first or second stator element is displaced axially relative to the rotor shaft such that the air gap formed between the respective first or second stator element and the rotor body is reduced in axial extent.

11. The axial flux machine according to claim 1, wherein the first and second stator elements are arranged floating on the rotor shaft or on a rotor shaft receptacle, and the first and second stator elements support one another via the adjustment device.

12. The axial flux machine according to claim 2, wherein the spring device produces the spring force characteristic curve which, over the entire adjustment path, is below a function F magnet_grenz=F magnet+Fmagnet_max*0.3.

13. An electric axial flux machine, comprising:
a stator with a first stator element and with a second stator element arranged spaced apart axially from the first stator element;

a rotor with a rotor body arranged on a rotor shaft, the rotor body comprising a disk arranged axially between the first stator element and the second stator element;

wherein the first stator element and the second stator element are arranged movably in an axial direction in relation to the rotor body;

an adjustment device configured to adjust the first stator element and the second stator element in the axial direction in order to set an air gap; and the adjustment device is configured to adjust the first stator element and the second stator element in the axial direction depending on a torque which is to be transmitted via the rotor shaft and which generates a resulting supporting moment on the first stator element and on the second stator element;

wherein the adjustment device comprises at least one spring device which acts on the first stator element and on the second stator element counter to a magnetic attraction force between the rotor body and the stator, and the spring device is configured such that a spring force characteristic curve is formed which extends above a magnetic force characteristic curve over an entire adjustment path, and wherein the first spring element produces a linear spring force characteristic curve.

14. The axial flux machine according to claim 10, further comprising stopping means between a first one of the stationary adjustment elements and a second one of the stationary adjustment elements, the stopping means are configured such that, in an operating state with a predetermined torque which is above a predetermined maximum adjustment torque, an occurring torque is transmitted via the stopping means instead of via the corresponding first and second ramp means of the first and second adjustment elements.

15. The axial flux machine according to claim 1, wherein the first stator element and the second stator element are rotationally coupled to one another such that during operation of the axial flux machine no relative rotation takes place between the first stator element and the second stator element.

16. The axial flux machine according to claim 1, wherein the first spring element comprises at least six individual leaf spring assemblies as well as a carrier ring having an annular disk shape and two spring bearing rings, and three leaf spring assemblies are arranged between the carrier ring which is axially centrally arranged and in each case one axially adjacent carrier ring, distributed uniformly around a circumference, on each side.

17. The axial flux machine according to claim 16, wherein the spring device is constructed such that the two spring bearing rings, which are arranged axially spaced apart from the central carrier ring and are fixedly connected on both sides to the respective individual leaf spring assemblies, move rotationally in a same direction over the entire axial adjustment path and without a relative rotational offset with respect to one another.

18. The axial flux machine according to claim 2, wherein the second and third spring elements produce a progressive spring force characteristic curve.

19. The axial flux machine according to claim 15, wherein the rotational coupling between the first and second stator elements includes at least one of a spring device arranged between the first and second stator elements, a friction-locking connection between the two rotor bodies, or a connector element between the spring device and each of the first and second stator elements.

\* \* \* \* \*